United States Patent
Wall

(10) Patent No.: US 10,620,373 B2
(45) Date of Patent: Apr. 14, 2020

(54) DISPLAY SYSTEM

(71) Applicant: AUDI AG, Ingolstadt (DE)

(72) Inventor: Christian Wall, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/342,690

(22) PCT Filed: Apr. 19, 2018

(86) PCT No.: PCT/EP2018/060057
§ 371 (c)(1),
(2) Date: Apr. 17, 2019

(87) PCT Pub. No.: WO2018/197334
PCT Pub. Date: Nov. 1, 2018

(65) Prior Publication Data
US 2020/0049887 A1    Feb. 13, 2020

(30) Foreign Application Priority Data

Apr. 26, 2017   (DE) ........................ 10 2017 207 041

(51) Int. Cl.
*G02B 6/26* (2006.01)
*B60R 11/02* (2006.01)
(Continued)

(52) U.S. Cl.
CPC ............... *G02B 6/26* (2013.01); *B60K 35/00* (2013.01); *B60R 11/0235* (2013.01);
(Continued)

(58) Field of Classification Search
None
See application file for complete search history.

(56) References Cited

U.S. PATENT DOCUMENTS 5,675,687 A    10/1997  Wood
6,021,241 A     2/2000  Bilbro et al.
(Continued)

FOREIGN PATENT DOCUMENTS

DE    10 2008 037 977 A1    2/2010
DE    10 2011 075 884 A1   11/2012
(Continued)

OTHER PUBLICATIONS

International Search Report dated Jul. 9, 2018 from International Patent No. PCT/EP2018/060057, 2 pages.
(Continued)

*Primary Examiner* — Tina M Wong
(74) *Attorney, Agent, or Firm* — Staas & Halsey LLP

(57) ABSTRACT

At least one display device, at least one light-guide structure module, and a cover plate are included in a display system. The at least one light-guide structure module is located between the at least one display device and the cover plate. The at least one display device includes a display panel for displaying a display content. The display panel is surrounded by a visible frame delimited by an inner edge and an outer edge. At least one portion of the outer edge of the visible frame defines at least one line on the cover plate by a parallel projection along an axis oriented perpendicularly to the cover plate. The at least one light-guide structure module enlarges the display content of the at least one display device and projects a portion of the inner edge of the visible frame onto the at least one line of the cover plate.

15 Claims, 3 Drawing Sheets

(51) Int. Cl.
*B60K 35/00* (2006.01)
*B60R 11/00* (2006.01)

(52) U.S. Cl.
CPC .. *B60K 2370/152* (2019.05); *B60K 2370/336* (2019.05); *B60R 2011/0003* (2013.01)

(56) References Cited

U.S. PATENT DOCUMENTS

| | | | | |
|---|---|---|---|---|
| 6,438,296 | B1* | 8/2002 | Kongable | G02B 6/04 356/4.01 |
| 8,841,998 | B2* | 9/2014 | Yamada | B60K 37/06 340/461 |
| 9,731,602 | B2* | 8/2017 | Kim | G06F 1/1601 |
| 10,509,613 | B2* | 12/2019 | Soh | B60R 11/0235 |
| 2007/0061068 | A1 | 3/2007 | Okamoto et al. | |
| 2015/0328989 | A1 | 11/2015 | Ishikawa et al. | |

FOREIGN PATENT DOCUMENTS

| | | |
|---|---|---|
| DE | 10 2017 207 041.2 | 4/2017 |
| WO | 2006/009390 A1 | 1/2006 |
| WO | PCT/EP2018/060057 | 4/2018 |

OTHER PUBLICATIONS

Wikipedia, "Holografie"; URL: https://de.wikipedia.org/w/index.php?title=Holografie&oldid=162729986; 12 pages.
German Office Action dated Apr. 11, 2018 from German Patent Application No. 10 2017 207 041.2, 6 pages.
German Office Action dated Nov. 7, 2018 from German Patent Application No. 10 2017 207 041.2, 4 pages.
German Office Action dated Dec. 17, 2018 from German Patent Application No. 10 2017 207 041.2, 14 pages.
English translation of the International Preliminary Report on Patentability dated Nov. 7, 2019 from International Patent Application No. PCT/EP2018/060057, 10 pages.

* cited by examiner

DISPLAY SYSTEM

CROSS REFERENCE TO RELATED APPLICATIONS

This application is a U.S. national stage of International Application No. PCT/EP2018/060057, filed on Apr. 19, 2018. The International Application claims the priority benefit of German Application No. 10 2017 207 041.2 filed on Apr. 26, 2017. Both the International Application and the German Application are incorporated by reference herein in their entirety.

BACKGROUND

Described herein is a display system and a method for representing at least one display content.

A display system is configured for optically representing a display content. Such a display system can also be embodied and/or referred to as a display or monitor.

A display apparatus for a vehicle and a method for displaying information in an interior space of a vehicle are described in German Patent Application Publication No. 10 2008 037 977 A1.

An information display device for a vehicle is described in U.S. Patent Application Publication No. 2007/0061068 A1.

A further display device for a vehicle is described in U.S. Patent Application Publication No. 2015/0328989 A1.

SUMMARY

Against this background, described herein is a display system and method to adapt a display content of a display device.

The display system described herein has at least one display device, at least one light-guide structure module and a cover plate, wherein the at least one light-guide structure module is arranged between the at least one display device and the cover plate. The at least one display device includes a display field for optically representing a display content, wherein the display field and/or the display device is/are enclosed by a visible frame, wherein the visible frame is delimited by an inner periphery and also by an outer periphery. The at least one section of the outer periphery defines at least one line on the cover plate by way of parallel projection along an axis, which is oriented perpendicularly to the cover plate. The at least one light-guide structure module is configured to enlarge or zoom the display content of the at least one display device and to project the at least one section of the first inner periphery of the visible frame and consequently of the display field onto the at least one defined line of the cover plate, wherein only the display content of the at least one display field is representable by way of the cover plate.

In general, the at least one light-guide structure module is arranged on the at least one display device, and the cover plate is arranged on the at least one light-guide structure module.

In the case of an optical representation or display of a display content of the at least one display device by way of the at least one light-guide structure module and the cover plate, the frame of the at least one display device is masked out.

The display system in a refinement includes a plurality of display devices, wherein provision is made, for two display devices which are in general immediately adjacent to one another, of the fact that at least one section of a second outer periphery of a visible frame, which encloses a display field of a first display device, and at least one section of a second outer periphery of a visible frame, which encloses a display field of a second display device, are immediately adjacent and/or abut at at least one common section, for example. Depending on the definition, in each case one display device is enclosed here by the frame. Alternatively or in addition, the frame, which encloses at least the display field of a respective display device, is configured as a component of the display device. The at least one common section and the two sections of the outer peripheries of the frame of the immediately adjacently arranged display devices are arranged on a straight line. In addition, this at least one common section defines, by way of a parallel projection along an axis that is perpendicular to the cover plate, the at least one line of the cover plate, wherein the line extends on an outer surface of the cover plate which faces away from the at least one light-guide structure module, whereas an inner surface of the cover plate, which is arranged parallel to the outer surface, faces the at least one light-guide structure module and is in contact therewith in an embodiment. It is here also possible that the at least one for example virtually defined or definable line is arranged on the inner surface of the cover plate.

The at least one light-guide structure module is embodied to project the at least one section of the first inner periphery of the visible frame, which delimits or encloses the display field of the first display device, and the at least one section of the first inner periphery, which delimits or encloses the display field of the second display device, onto the or onto the same at least one line of the cover plate. The at least one common section of the second outer peripheries of the two visible frames of the display fields defines, by way of parallel projection along the axis, the at least one line of the cover plate.

Provision is furthermore made of the fact that at least one section of a second outer periphery of the visible frame, which encloses or delimits the at least one display field, wherein the at least one section of the second outer periphery of the visible frame defines the at least one line of the cover plate by way of parallel projection along the axis, which is perpendicular to the cover plate and extends along an edge of the cover plate. The at least one light-guide structure module is embodied to project the at least one section of the first periphery of the visible frame, which delimits the display field of the at least one display device and is assigned to the at least one section of the second outer periphery of the visible frame, onto the at least one line along the periphery of the cover plate.

In general, each display device is assigned a light-guide structure module. The one light-guide structure module is arranged between the respective display device to which it is assigned and the cover plate. In the case of the two immediately adjacently arranged display devices, provision is made of the fact that two light-guide structure modules are likewise arranged immediately adjacently. A first light-guide structure module, which is assigned to a first display device, is embodied to project the at least one section of the first inner periphery of the visible frame, which delimits or encloses the display field of the first display device, onto the, or onto the same, at least one line of the cover plate, wherein the at least one common section of the second outer peripheries of both visible frames of the display fields of both generally immediately adjacent display devices defines the at least one line of the cover plate by way of parallel projection along the axis, which is perpendicular to the cover plate. A second light-guide structure module, which is assigned to a second display device, is embodied to project the at least one section of the first inner periphery of the visible frame, which delimits or encloses the display field of the second display device, likewise onto the, or onto the same, at least one line of the cover plate, wherein the at least one common section of the second outer peripheries of both visible frames of the display fields of both generally immediately adjacent display devices and the at least one line of the cover plate are parallel with respect to one another.

The at least one light-guide structure module is arranged between the at least one display device and the cover plate and has a body having a first outer side, which faces the at least one display device, and a second outer side, which faces the cover plate. The two outer sides are here arranged mutually parallel, wherein the first outer side has a smaller surface than the second outer side. At least one section of at least one edge of the first outer side of the at least one light-guide structure module is assigned to the at least one section of the at least one first inner periphery of the visible frame of the display field of the at least one display device, wherein the first outer side of the at least one light-guide structure module and the display field of the at least one display device are congruent and face one another. In addition, at least one section of at least one edge of the second outer side of the at least one light-guide structure module is assigned to the at least one section of the at least one line of the cover plate, wherein the at least one line is defined by way of parallel projection of the at least one section of the second outer periphery of the same visible frame along the axis, which is oriented perpendicularly to the cover plate. The frame is delimited by the same at least one section of the first inner periphery that is assigned to the at least one section of the first edge of the first outer side of the at least one light-guide structure module.

In a configuration, the at least one display device includes an n-polygonal display field for representing a display content. For example, n in the term n-polygonal here refers to any desired natural number, for example three, wherein the display field is for example triangular. The inner periphery of the visible frame and the outer periphery of the visible frame, which are arranged parallel with respect to one another, are here likewise n-polygonal. In a configuration, the sections of both peripheries of the visible frame are assigned to one another, wherein the at least one section of the first inner periphery also delimits the display field of the at least one display device and/or the at least one display field. The peripheries of a frame are generally arranged mutually parallel, wherein the outer periphery encloses the inner periphery. A display surface of the display device has an angled, for example quadrangular, design in an embodiment, that is to say for example rectangular or square. The peripheries of the frame of a display device have a correspondingly angled design, wherein an inner periphery has the same lateral length as an outer edge of a display field. Peripheries of an angled frame, which encloses an angled display field, are straight here. Accordingly, the at least one line of the cover plate and the common section of the outer peripheries are straight.

It is possible here that the at least one light-guide structure module between the at least one display device and the cover plate has a body in the shape of a truncated pyramid. The two outer sides of such a body, having the shape of a pyramid, of the at least one light-guide structure module are likewise n-polygonal, generally quadrangular, for example rectangular, in accordance with a shape of the display field of the at least one display device, to which the at least one light-guide structure module is assigned.

In the display system, the cover plate is embodied in the form of a cover glass. The cover plate is made of a transparent material, which is for example glass or plastic.

The display system is usable in a vehicle and/or for a vehicle and is arrangeable on an inner wall in an interior space of the vehicle.

The at least one light-guide structure module is configured to refract the light, by way of which the display content of the display field of the at least one display device is provided, and to thus enlarge the display content. Here, the at least one light-guide structure element, for example in the form of a prism which has the shape of a truncated pyramid and/or is trapezoidal in cross section, is embodied in the form of a light control film and/or a holographically optical element, and is made for example of plastic.

The method described herein is provided for optically representing a display content using a display system which has at least one display device, at least one light-guide structure module and a cover plate, wherein the at least one light-guide structure module is arranged between the at least one display device and the cover plate, wherein the at least one display device includes a display field for representing a display content, wherein the display field is enclosed by a visible frame, wherein the visible frame is delimited by a first inner periphery and also by a second outer periphery. In the method, at least one line is defined on the cover plate by way of at least one section of the outer periphery of the visible frame by way of parallel projection along an axis, which is oriented perpendicularly to the cover plate.

The display content of the at least one display device is enlarged with the at least one light-guide structure module, wherein the at least one section of the first inner periphery of the visible frame and consequently of the display field is projected by the at least one light-guide structure module onto the at least one line of the cover plate, wherein only the display content of the at least one display field is represented by way of the cover plate and the typically visible frame is masked out.

The method in a configuration is provided for representing a display content which is common for at least two display devices. Here, provision is made, for two generally immediately adjacent display devices, of the fact that at least one section of a second outer periphery of a visible frame, which encloses a display field of a first display device, and at least one section of a second outer periphery of a visible frame, which encloses a display field of a second display device, are generally immediately adjacent and/or abut at at least one common section. The at least one common section defines the at least one line of the cover plate by way of parallel projection of an axis, which is oriented perpendicularly to the cover plate. The at least one line extends on an outer surface of the cover plate which faces away from the at least one light-guide structure module, whereas an inner surface of the cover plate, which is arranged parallel to the outer surface, faces the at least one light-guide structure module and is in contact therewith in an embodiment. The at least one section of the first inner periphery of the visible frame, which delimits or encloses the display field of the first display device, and the at least one section of the first inner periphery, which delimits or encloses the display field of the second display device, are projected by the at least one light-guide structure module onto the, or onto the same, at least one line of the cover plate which is parallel to the at least one common section of the second outer peripheries of the two visible frames of the display fields of the two generally immediately adjacent display devices.

In an embodiment of the method, provision is made for each of the display devices to be assigned a light-guide structure module, wherein display contents from in each case two generally immediately adjacent display devices are connected by way of the light-guide structure modules, which are assigned to the two display devices, to form the common display content.

In addition, the display contents of the two generally immediately adjacent display devices are connected by the light-guide structure modules along the at least one common line to form the common display content, wherein the at least one common section of the second outer periphery of the visible frame and the at least one line of the cover plate are parallel with respect to one another.

As already described above, it is possible that each of the display devices of the display system is assigned a light-guide structure module which is typically in the shape of a truncated pyramid. It is here possible in a refinement of the method that individual display contents from in each case two generally immediately adjacent display devices are connected by way of the light-guide structure modules, which are assigned to the two display devices, to form the common display content and are thus fused.

In this respect, it is furthermore possible that the display contents of the two generally immediately adjacent display devices are connected by the light-guide structure modules along a typically common line on at least one of the surfaces of the cover plate, that is to say the inner and/or outer surface, which with respect to a common section of the second outer peripheries of the two generally immediately adjacent display devices to form the common display content, wherein the common section and the at least one line of the cover plate are parallel with respect to one another.

In a configuration it is possible that the display system includes a plurality of display devices, wherein each display device has a display field, which is surrounded by a visible frame and on which a light-guide structure module is arranged. The plurality of light-guide structure modules of the display system are used to connect individual display contents of display fields of the display devices to form one display content which is common for all display devices. The individual display contents of generally immediately adjacent display devices are here composed along the common line on the cover plate by the light-guide structure modules to form the common display content. It is thus possible to compose a plurality of display contents of the plurality of display devices to form the common display content. The frames, which enclose the display surfaces of the display devices, are here masked out by the light-guide structure modules.

With the display system, a display arrangement is provided, in which displays or monitors and thus display fields or screens of at least two display devices are fused.

The display system is able to be integrated for example in a vehicle and is typically used as a design element. It is possible with the display system to represent a plurality of display fields without peripheries. It is also possible to compose display contents of individual display fields to form a larger common display content on the cover plate of the display system.

Typically, a plurality of individual display devices are modularly composed to provide the display system, wherein provision is made for the use of display devices having display fields which are enclosed in each case by frames. It is possible here to use identically designed display devices for a display system, which have the same dimensions, a plurality of times.

Using the display system, display contents of typically immediately adjacently arranged display devices are seamlessly composed. In a refinement, a light-guide structure module is arranged on each display device between the respective display device and the cover plate. Provision is made here of the fact that the first outer side of the body, which for example has the shape of a truncated pyramid, of a respective light-guide structure module is merely in contact with the display field of the respective display device and/or is arranged on this display field. Generally, each display field is assigned a surface of the cover plate, wherein the surface of the cover plate is delimited by at least one line, wherein the at least one section of the outer periphery of the visible frame of the respective display device, which encloses the display field thereof, and the at least one line of the cover plate are mutually parallel. In an embodiment of the method with the introduced display system, it is thus possible to completely project the display content of the display field of the respective display device onto the surface of the cover plate which is assigned thereto.

Using a light-guide structure module of a respective display field or display device, the display content thereof is enlarged, wherein a resulting enlarged display content extends, with respect to a size or surface area, beyond a mechanically fixed size or surface area of the display field.

The method is used to seamlessly compose a plurality of display contents of a plurality of smaller display fields of respective display devices to form an enlarged common display field.

Further advantages and refinements are apparent from the description and the attached drawings.

It is to be understood that the aforementioned features and the features which will be explained below are usable not only in the respectively stated combination, but also in other combinations or alone, without departing from the scope of the disclosure.

BRIEF DESCRIPTION OF THE DRAWINGS

These and other aspects and advantages will become more apparent and more readily appreciated from the following description of the examples, taken in conjunction with the accompanying drawings of which.

DETAILED DESCRIPTION

Figure 1A:
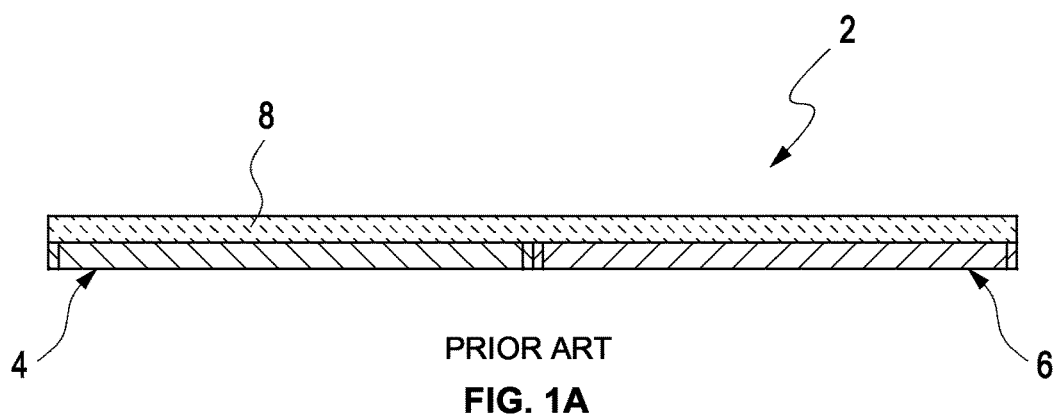
FIGS. 1A-1C are schematic illustrations detailing a known display arrangements, which include a plurality of display fields, from different perspectives.

Reference will now be made in detail to examples which are illustrated in the accompanying drawings.

The drawings will be described in a coherent and comprehensive manner. The same reference numerals are assigned to the same components.

Figure 1B:
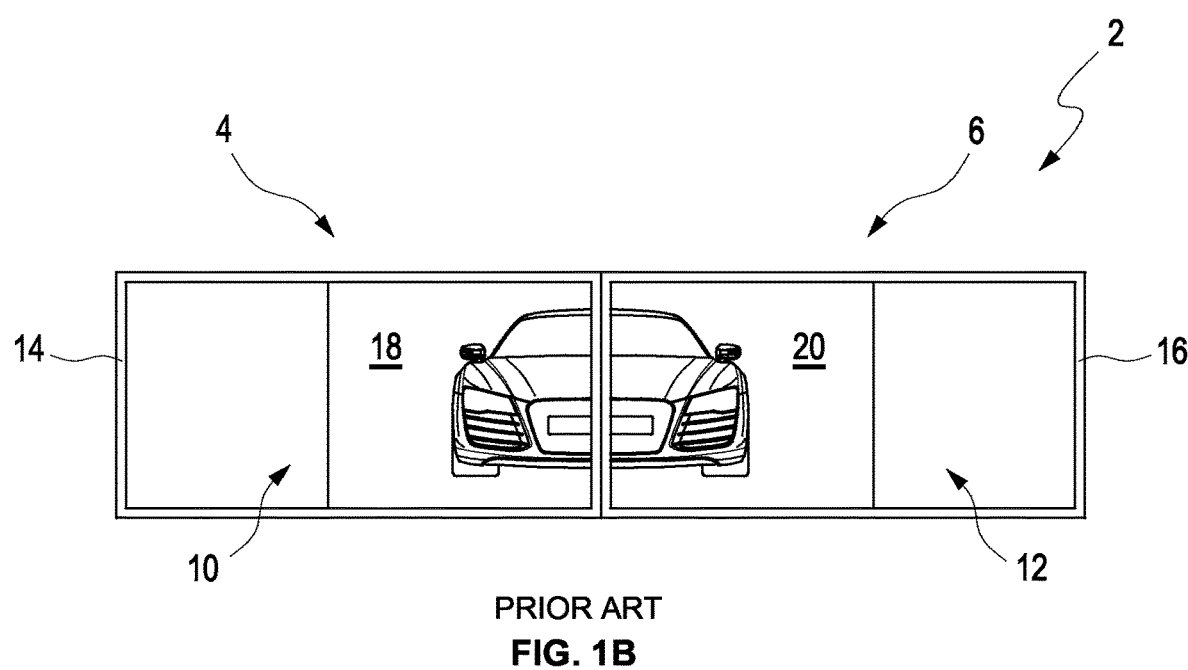
Figure 1C:
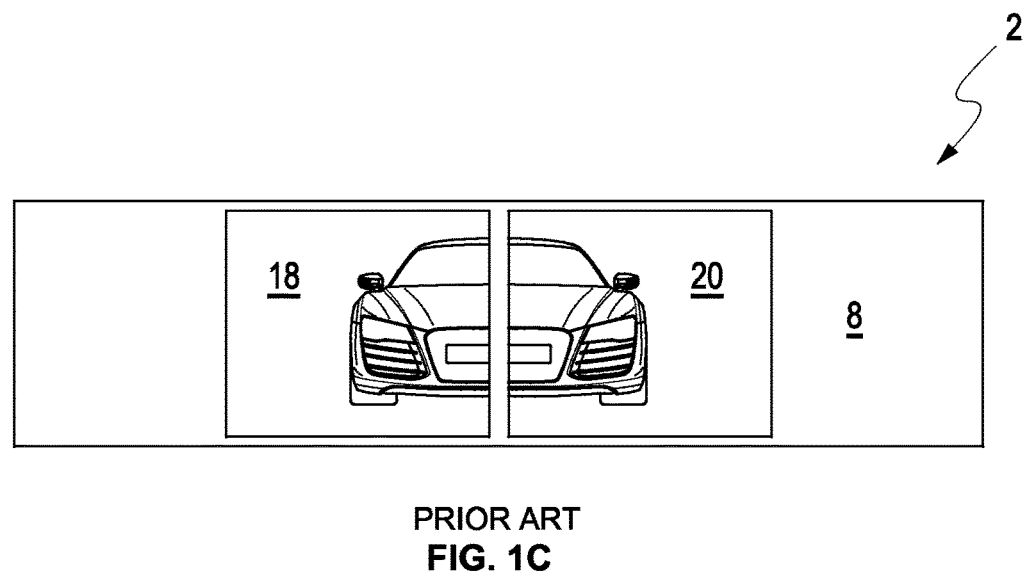

The known display arrangement 2 is illustrated in FIG. 1A in a sectional view and in FIGS. 1B and 1C respectively from above. This display arrangement 2 includes a first display device 4 and a second display device 6, which are arranged here directly next to one another. In addition, a cover plate 8 is arranged on these two display fields 4, 6. Each of these two display fields 4, 6 includes an active display field 10, 12, wherein such an active display field 10, 12 is respectively surrounded by a frame 14, 16.

Provision is made here for a display content 18, 20 to be represented on in each case one display field 10, 12, wherein a first display content 18 of a first display field 10 of the first display device here shows a first part of a vehicle. A second display content 20 of the second display field 12 of the second display device 6 shows a second part of the vehicle.

As is shown in FIG. 1C, the two display contents 18, 20 are separated from one another upon observation of the display arrangement 2 by the frames 14, 16, which enclose the display fields 10, 12 of the display devices 4, 6, even upon observation through the cover plate 8.

The embodiment of the display system 30 described herein, which is illustrated schematically in FIGS. 2A-2D, includes a first display device 32 and a second display device 34, two light-guide structure modules 36, 38 and a cover plate 40.

Figure 2A:
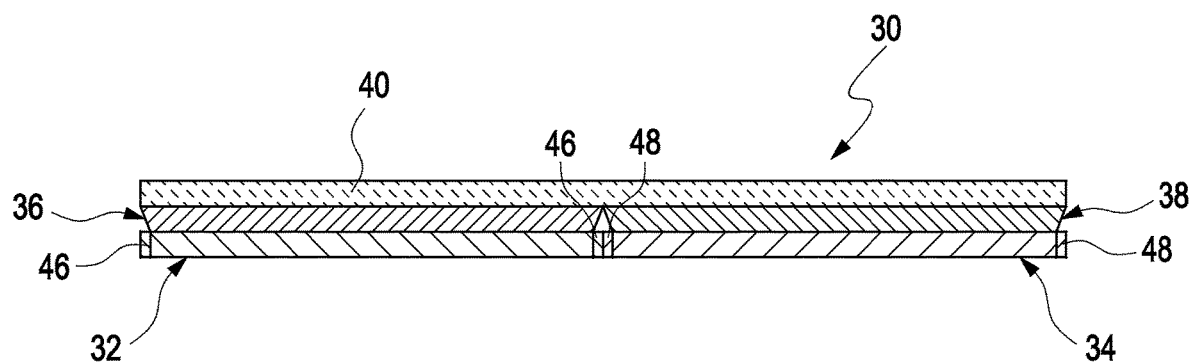
FIGS. 2A-2D are schematic illustrations of example embodiments of the display system described herein from different perspectives.

This display system 30 is illustrated schematically in FIG. 2A in a sectional view.

Figure 2B:
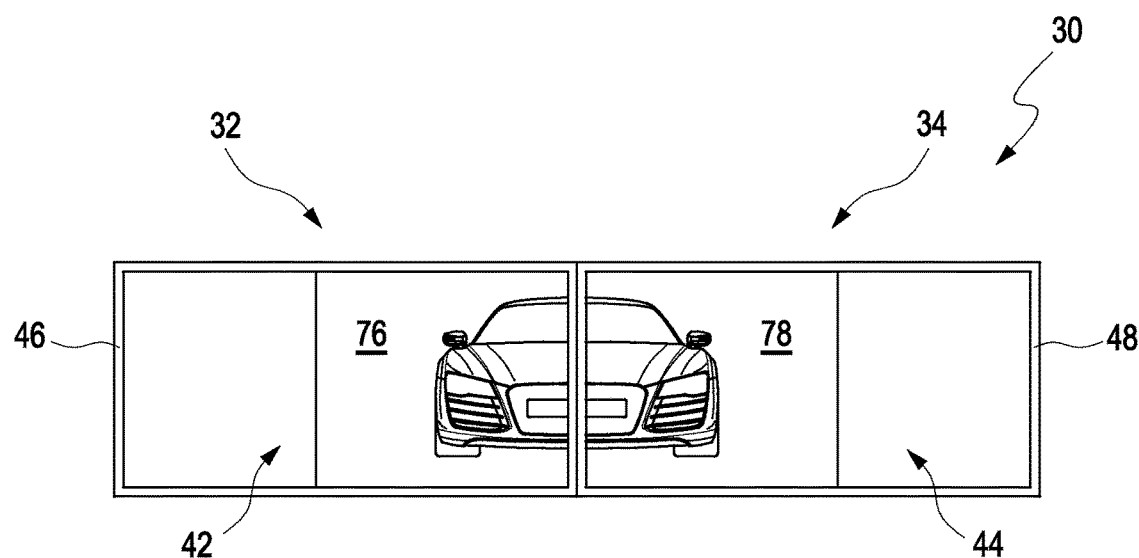

FIG. 2B shows the two display devices 32, 34 of the display system 30 in a schematic illustration from above.

Figure 2C:
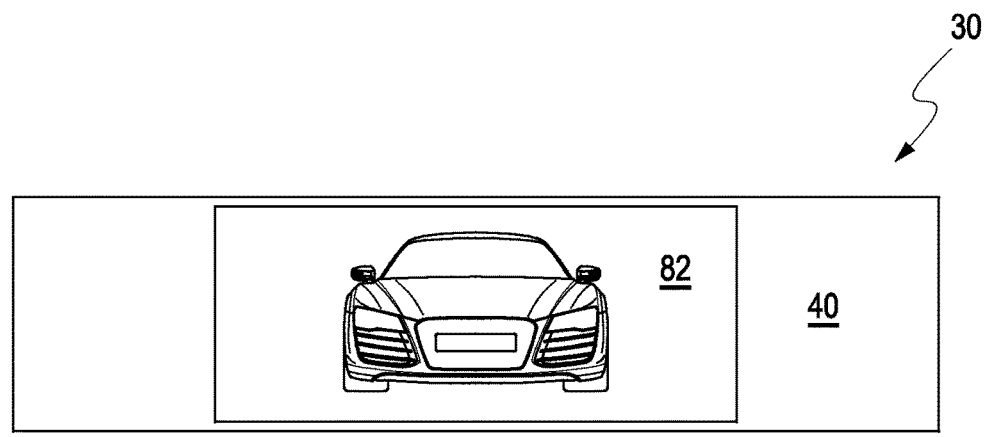

FIG. 2C shows an appearance image, which is represented for a viewer upon performance of an embodiment of the method described herein by way of the display system 30, in a schematic illustration.

Figure 2D:
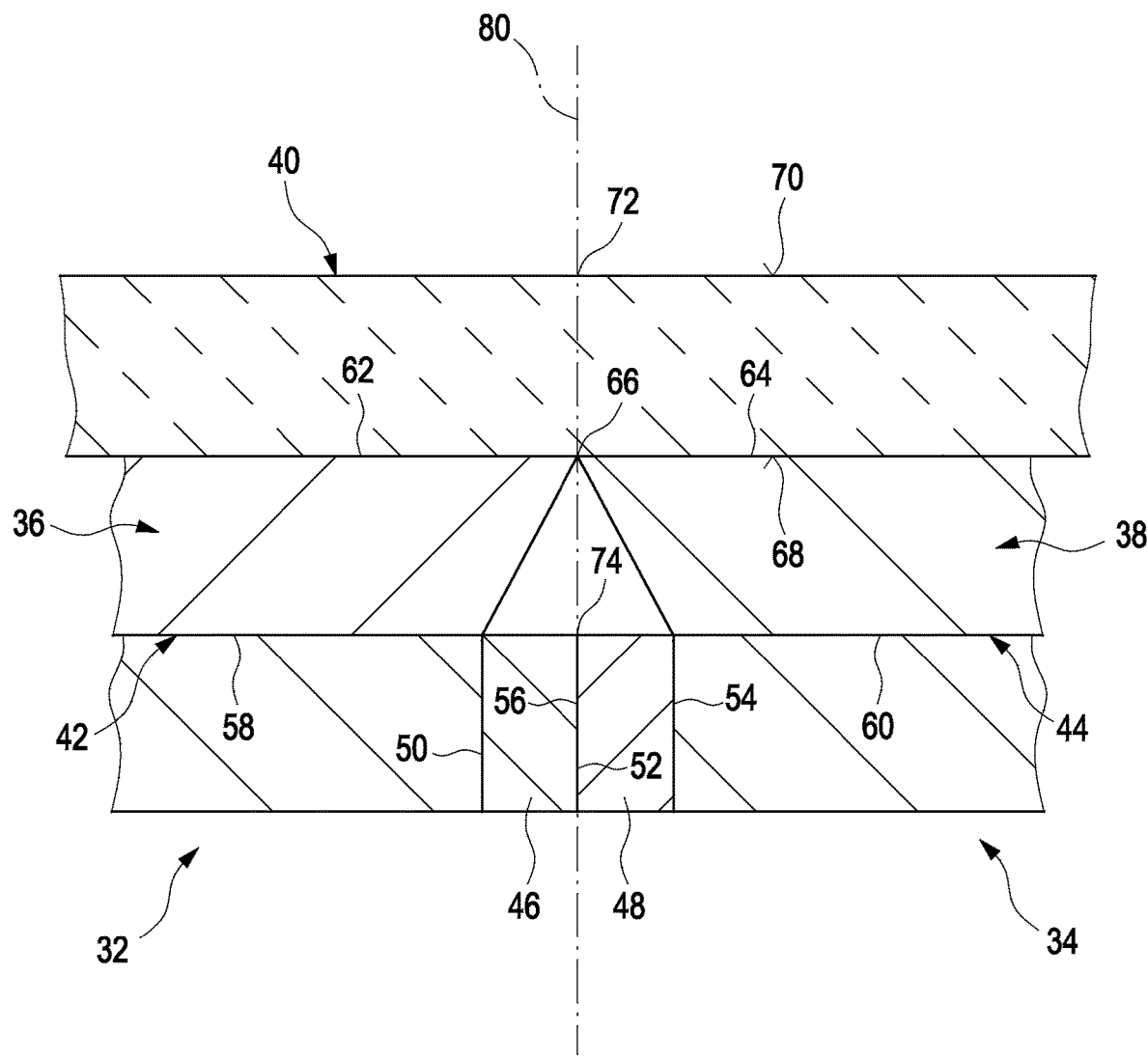

FIG. 2D furthermore shows a detail from FIG. 2A in schematic illustration in a region in which the display devices 32, 34 and the light-guide structure modules 36, 38 abut.

Provision is made for the two display devices 32, 34 to be arranged here directly next to one another. Each display device 32, 34 includes a here active display field 42, 44, which is enclosed by a frame 46, 48, wherein a respective frame 46, 48 likewise encloses a respective display device 32, 34 and/or is embodied as a component of the respective display device 32, 34.

As is shown in FIG. 2D, a frame 46 of the first display device 32 has an inner periphery 50 and an outer periphery 52. The inner periphery 50 here encloses and/or delimits the display field 42 of the first display device 32. The outer periphery 52 of the frame 46, which is arranged parallel to the first periphery 50, delimits and/or encloses here the frame 46, here in a refinement of an outer edge of the frame 46 of the first display device 32.

Correspondingly, the frame 48 of the second display device 34 likewise has an inner periphery 54 and an outer periphery 56, wherein the inner periphery 54 encloses and/or delimits the display field 44 of the second display device 34. The outer periphery 56 here encloses furthermore the frame 48 of the second display device 34 and the outer edge thereof.

The frames 46, 48 of both display devices 32, 34 are thus delimited in each case by an inner periphery 50, 54 and an outer periphery 52, 56, wherein the inner peripheries 50, 54 are arranged in a straight manner relative to the corresponding outer peripheries 52, 56 of in each case one frame 46, 48 and in each case mutually parallel.

Each of the two light-guide structure modules 36, 38 has, in the embodiment of the display system 30, a body in the shape of a truncated pyramid, wherein each light-guide structure module 36, 38 is embodied to be trapezoidal in cross section (FIG. 2A). As shown in detail in FIG. 2D, each light-guide structure module 36, 38 has a first outer side 58, 60 and a second outer side 62, 64. Provision is made here for in each case a first outer side 58, 60 of a respective light-guide structure module 36, 38 to be congruent with a display field 42, 44 of a display device 32, 34, that is to say to have the same dimensions as the respective display field 42, 44 and also to be arranged congruently on the respective display field 42, 44.

The cover plate 40 is arranged on the two outer sides 62, 64 of the two light-guide structure modules 36, 38, wherein edges of the second outer sides 62, 64 are in contact along a common line 66, wherein this common line 66 is at the same time assigned to an inner surface 68 of the cover plate 40 and/or is defined for the cover plate 40, wherein the two second outer sides 62, 64 of the two light-guide structure modules 36, 38 are in contact with this inner surface 68 of the cover plate 40. In addition, this cover plate 40 has an outer surface 70, for which a line 72 is defined here, wherein this line 72 and the line 66 between the edges of the two second outer sides 62, 64 of the two light-guide structure modules 36, 38 or on the inner surface 68 are parallel with respect to one another and are connected by an axis 80, which is oriented perpendicularly to the cover plate 40, wherein the outer surface 70 and the line 66 on the inner surface 68 of the cover plate 40 face away from the light-guide structure modules 36, 38. Provision is additionally made for this line 72 to be arranged on the outer surface 70 of the cover plate 40. In addition, a common rectilinear section 74 of the two outer peripheries 52, 56 of the frames 46, 48, which enclose the display fields 42, 44 of the display devices 32, 34, is provided here, which section defines the line 72 by way of parallel projection along the axis 80. Provision is made here for this common section 74 to be arranged centrally between the two parallel outer peripheries 52, 56 of the frames 46, 48 and/or to extend on these two outer peripheries 52, 56. In this case, the two outer peripheries 52, 56 abut at the common section 74, wherein the common section 74 is assigned to the two outer peripheries 52, 56 and/or is defined herefor.

If the two display devices 32, 34 are arranged immediately or directly next to one another, the two frames 46, 48 are also in seamless contact along their outer peripheries 52, 56 along the common section 74.

As shown in FIG. 2B, a first partial image of a vehicle is represented, as first display content 76, on the first display field 42 of the first display device 32. Represented on the display field 44 of the second display device 34 is, as second display content 78, a second partial image of the vehicle. In the embodiment of the method, the two inner peripheries 50, 54 of the two frames 46, 48, which enclose the two display fields 42, 44, are projected onto the common line 66 of the inner surface 68 of the cover plate 40 and furthermore also onto the line 72 of the outer surface 68 of the cover plate 40. In the process, in each case one display content 76, 78 of a display field 42, 44 is enlarged by in each case one light-guide structure module 36, 38. Furthermore, the two display contents 76, 78 are here composed and/or fused into one common display content 82, wherein the two individual display contents 76, 78 are seamlessly connected to one another with masking-out of the frames 46, 48 (FIG. 2C). This common display content 82 now completely shows the vehicle, which is representable by the two display fields 42, 44 in each case only separately and/or partially.

A description has been provided with reference to examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A display system, comprising:
   a cover plate;
   at least one display device including at least one display field to represent a display content, the at least one display field being enclosed by a visible frame which is delimited by an inner periphery and by an outer periphery, at least one section of the outer periphery of the visible frame defining at least one line of the cover plate by way of parallel projection along an axis oriented perpendicularly to the cover plate; and
   at least one light-guide structure module, arranged between the at least one display device and the cover plate, configured to enlarge the display content of the at least one display device and to project at least one section of the inner periphery of the visible frame onto the defined at least one line of the cover plate.

2. The display system as claimed in claim 1, wherein
   the at least one display device is a plurality of display devices including a first display device and a second display device which are adjacent to one another,
   the first display device includes at least one first section of a first inner periphery of a first visible frame which encloses a first display field of the first display device and at least one first section of a first outer periphery of the first visible frame which encloses the first display field of the first display device,
   the second display device includes at least one second section of a second inner periphery of a second visible frame which encloses a second display field of the second display device and at least one second section of a second outer periphery of the second visible frame which encloses the second display field of the second display device,
   the at least one first section of the first outer periphery and the at least one second section of the second outer periphery abut at at least one common section which defines the at least one line of the cover plate by way of parallel projection along the axis which is oriented perpendicularly to the cover plate, and
   the at least one light-guide structure module is configured to project the at least one first section of the first inner periphery and the at least one second section of the second inner periphery, onto the defined at least one line of the cover plate.

3. The display system as claimed in claim 1, wherein
   the at least one section of the outer periphery of the visible frame encloses the at least one display field,
   the at least one line of the cover plate extends along an edge of the cover plate,
   the at least one section of the outer periphery of the visible frame and the at least one line of the cover plate are parallel with respect to one another, and
   the at least one section of the inner periphery of the visible frame delimits the at least one display field of the at least one display device and is parallel to the at least one section of the outer periphery of the visible frame.

4. The display system as claimed in claim 1, wherein each of the at least one display device is provided a light-guide structure module among the at least one light-guide structure module.

5. The display system as claimed in claim 1, wherein
   the at least one light-guide structure module has a body with a first outer side which faces the at least one display device and a second outer side which faces the cover plate,
   the first and second outer sides are arranged parallel with respect to one another,
   the first outer side has a smaller length than the second outer side,
   at least one section of at least one edge of the first outer side is assigned to the at least one section of the at least one inner periphery of the visible frame,
   the first outer side is assigned to the at least one display field of the at least one display device,
   the first outer side and the at least one display field of the at least one display device are congruent,
   at least one section of at least one edge of the second outer side is assigned to the at least one line of the cover plate,
   the at least one section of the outer periphery of the visible frame defines the at least one line of the cover plate by way of parallel projection along the axis oriented perpendicularly to the cover plate, and
   the visible frame is delimited by the at least one section of the inner periphery which is assigned to the at least one section of the first edge of the first outer side.

6. The display system as claimed in claim 1, wherein
   the at least one display device includes an n-polygonal display field to represent the display content, and
   the inner periphery of the visible frame and the outer periphery of the visible frame, which are arranged parallel with respect to one another, have an n-polygonal configuration.

7. The display system as claimed in claim 5, wherein the at least one light-guide structure module has a body in a shape of a truncated pyramid.

8. The display system as claimed in claim 1, wherein the display system is configured to be provided in a vehicle and is arrangeable at an inner wall in an interior space of the vehicle.

9. A method for representing a display content in a display system including a cover plate, at least one display device having at least one display field to represent a display content, and at least one light-guide structure module, the method comprising:
   providing the at least one light-guide structure module between the at least one display device and the cover plate;
   enclosing the at least one display field with a visible frame delimited by an inner periphery and an outer periphery, at least one section of the outer periphery of the visible frame defining at least one line of the cover plate by way of parallel projection along an axis oriented perpendicularly to the cover plate;
   enlarging, by the at least one light-guide structure module, the display content of the at least one display device; and
   projecting at least one section of the inner periphery of the visible frame onto the defined at least one line of the cover plate.

10. The method as claimed in claim 9, wherein
    the at least one display device is a plurality of display devices including a first display device and a second display device which are adjacent to one another,
    the first display device includes at least one first section of a first inner periphery of a first visible frame which encloses a first display field of the first display device and at least one first section of a first outer periphery of the first visible frame which encloses the first display field of the first display device,
    the second display device includes at least one second section of a second inner periphery of a second visible frame which encloses a second display field of the second display device and at least one section of a second outer periphery of the second visible frame which encloses the second display field of the second display device, and the at least one first section of the first outer periphery and the at least one second section of the second outer periphery abut at at least one common section which defines the at least one line of the cover plate by way of parallel projection along the axis oriented perpendicularly to the cover plate, the method further comprising:

projecting, by the at least one light-guide structure module, the at least one first section of the first inner periphery of the first visible frame and the at least one second section of the second inner periphery, onto the defined at least one line of the cover plate, and the at least one common section and the defined at least one line of the cover plate are parallel with respect to one another.

11. The method as claimed in claim 10, wherein the at least one light-guide structure module includes a first light-guide structure module and a second light-guide structure module, the first display device is assigned the first light-guide structure module, the second display device is assigned the second light-guide structure module, the method further comprising:

connecting, by the first light-guide structure module and the second light-guide structure module, display contents of the first and second display devices to form a common display content.

12. The method as claimed in claim 11, wherein the display contents of the first and second display devices are connected by the first and second light-guide structure modules along the defined at least one line of the cover plate to form the common display content.

13. The method as claimed in claim 11, wherein the first light-guide structure module and the second light-guide structure module each have a body in a shape of a truncated pyramid.

14. The method as claimed in claim 9, further comprising providing the display system in a vehicle.

15. The method as claimed in claim 9, wherein the display content of the at least one display device is enlarged by the at least one light-guide structure module such that the enlarged display content extends beyond a surface area of the at least one display field.

* * * * *